Oct. 10, 1933. A. I. MARCUM 1,930,208
SPRINGLESS MULTIWHEEL VEHICLE SUSPENSION
Filed March 7, 1930   2 Sheets-Sheet 1
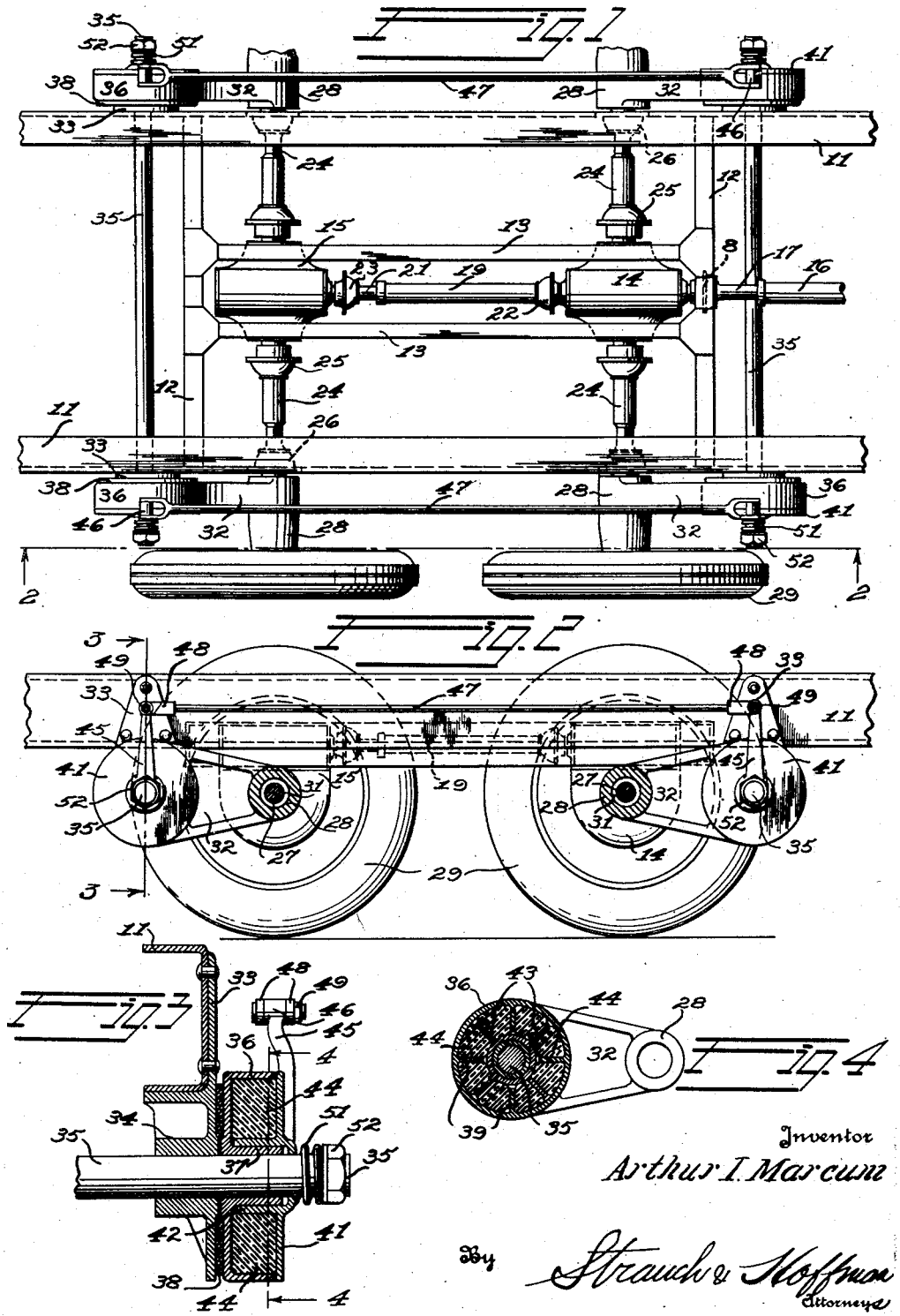
Inventor
Arthur I. Marcum
By Strauch & Hoffman
Attorneys

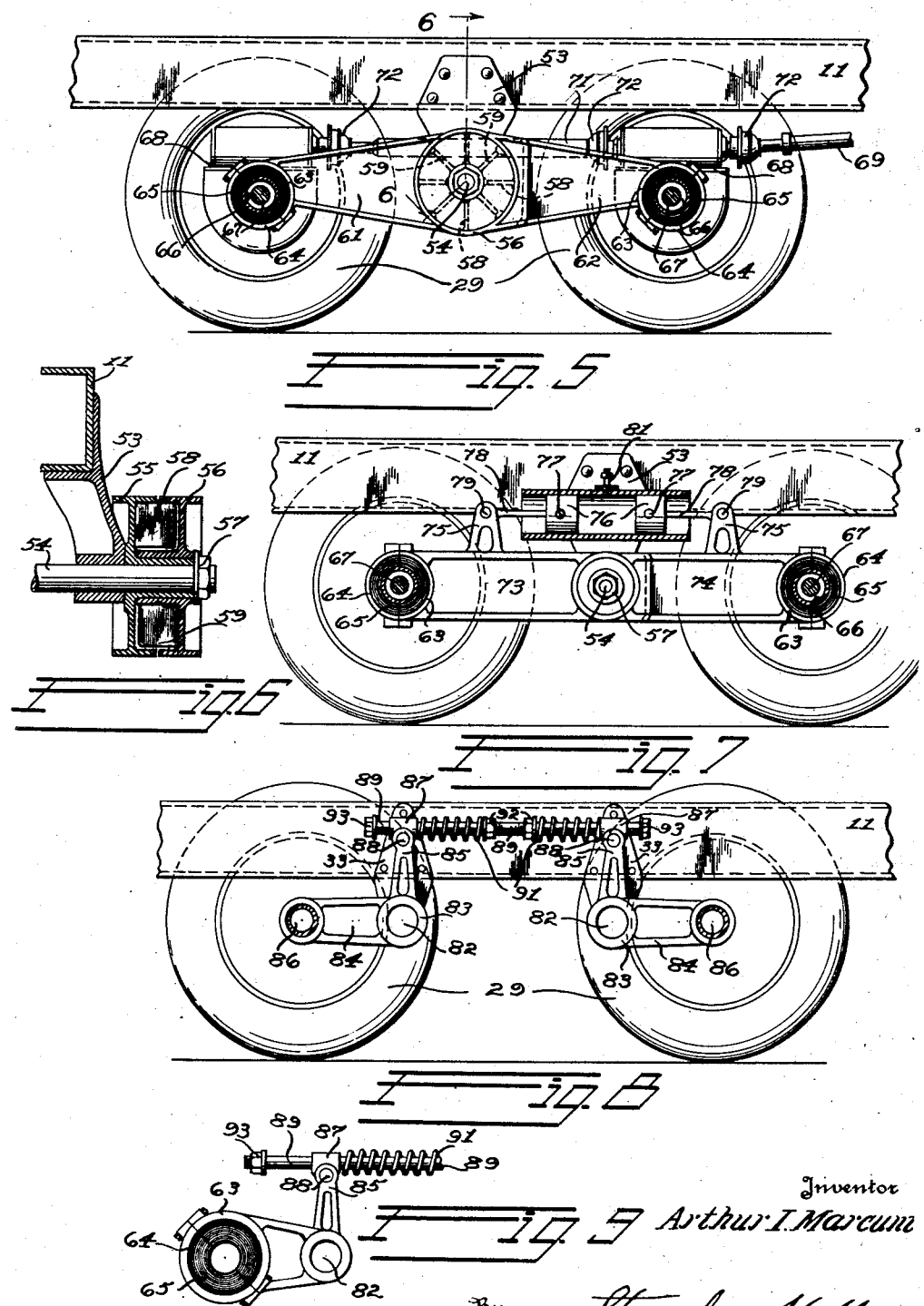

Patented Oct. 10, 1933

1,930,208

UNITED STATES PATENT OFFICE 1,930,208

SPRINGLESS MULTIWHEEL VEHICLE SUSPENSION

Arthur I. Marcum, Oakland, Calif., assignor, by mesne assignments, to Automotive Engineering Corporation, a corporation of Delaware Application March 7, 1930. Serial No. 434,059

6 Claims. (Cl. 280—104)

This invention relates to springless suspensions, i. e., suspensions in which the usual and conventional leaf springs may be eliminated. Although the purpose of this invention is largely to improve multi-wheel suspensions, some of the principles thereof are applicable and adaptable to suspensions for vehicles of all types.

Throughout the history of automotive development it has been common to utilize various types and combinations of leaf springs for supporting vehicle bodies and loads upon axles. Such suspensions always have been generally unsatisfactory and, in spite of modifications, refinements and rearrangements they remain more or less unsatisfactory at the present day. They are relatively expensive. When made too heavy they detract from the riding qualities of the vehicle. When made too light they are subject to breakage and excessive flexibility. When given the proper cushioning and shock-absorbing capacity for average loads they react improperly when the load varies to either side of said average. At times, depending upon the load and its distribution, they rebound to an extent greater than the original deflection from road shock, thus causing the vehicle body to oscillate and bob around like a cork on the ocean. This is particularly true when the spring deflection becomes periodic and in phase with body movement and road irregularities. Expensive shock absorbers and snubbers are generally added as auxiliary equipment to partially neutralize or dampen these undesirable movements.

Accordingly, it is a primary object of the present invention to devise a springless suspension which shall have none of the above-mentioned defects and disadvantages and which shall, independently of expensive auxiliary equipment, be inherently capable of imparting desirable riding qualities to the vehicle frame and body.

Due to progressive road development, culminating in an intricate network of hard and smooth surfaced highways in this country, it is perfectly feasible to eliminate some or all of the spring beams heretofore employed in suspensions and replace them with substantially rigid beams cushioned by deformable and resilient material. Rapid strides have been made in the rubber industry, and consequently various types of high grade rubber for all manner of uses may be purchased at low cost. Accordingly, it is a major object of this invention to replace existing spring suspensions with springless suspensions involving rubber cushioning devices.

The use of rubber in suspension systems is not a broadly new idea. It has been heretofore proposed to dispose rubber blocks at certain points in suspensions, but these proposals involved small blocks subjected to direct shocks, as at spring pivotal points and the like. I propose, however, to employ a simple set of arms and levers for acting upon a rubber body to deform it in much the same manner that it would be deformed by a pair of pincers.

It has been pointed out above that modern highways have removed the chief obstacle to the success of a springless suspension. However, even on relatively rough byways and undeveloped highways it is possible to transport loads on certain types of multi-wheeled vehicles having substantially rigid suspension elements, viz., the equalizing types in which tandem wheels are employed and in which the road shocks received by one set of tandem wheels are transmitted in part to the other set. These tandem wheel arrangements function, in effect, to cause the vehicle to "flow" over irregular road surfaces. Hence it is another important object of this invention to provide simple and improved multi-wheel equalizing suspensions.

More specifically, it is an object of the present invention to design new and improved springless suspensions of the equalizing type in which the load is applied to each suspension at only two points, which comprise relatively few and inexpensive parts.

It is a further object to provide equalizing suspensions in which a deformable material has the dual functions of cushioning shocks and of serving as part of an equalizing device.

It is also an object of this invention to provide a simple device for incorporation in multi-wheel suspensions to dampen the oscillation of the axles thereof.

Further objects are to devise improved types of resilient equalizing mechanisms for multi-wheel suspensions.

Other objects of this invention will become apparent from a study of the following detailed description when taken in connection with the accompanying drawings, in which:

Figure 1 is a partial plan view of a vehicle chassis, showing one embodiment of the present invention.

Figure 2 represents a side elevational view, partly in section, of the same apparatus as seen when looking upon the plane indicated by line 2—2 of Figure 1.

Figure 3 constitutes a detailed section taken on the vertical transverse plane designated by line 3—3, Figure 2.

Figure 4 shows a detail of the supporting structure, as seen when looking upon the vertical plane indicated by line 4—4 of Figure 3.

Figure 5 is a view similar to Figure 2 but showing another embodiment of my invention.

Figure 6 represents a detailed sectional view as seen on the intersecting planes designated by line 6—6 in Figure 5.

Figure 7 constitutes a modified form of the apparatus of Figure 5.

Figure 8 is a still further modification, similar in some respects to Figure 2 and in other respects to Figures 5 and 7.

Figure 9 shows a modified form of one end of the suspension of Figure 8.

With reference now to the drawings, in which like numerals are employed to designate like parts, and with particular attention to Figures 1-4 inc., numeral 11 designates a portion, preferably one end, of the main chassis frame of a road vehicle. Frame 11 supports a pair of spaced cross-members 12 which in turn support a pair of longitudinal frame elements 13. The latter are designed to form a bridge for suspending a pair of worm and differential housings 14 and 15. A propeller tube 16, telescopingly engaging a shaft section 17, drives the mechanism (not shown) within housing 14 by way of a universal joint 18, and has a through connection to a driving tube section 19 and spline shaft 21. The latter projects into the worm and differential housing 15 to drive the mechanism (not shown) within the latter. A pair of universal joints, 22 and 23 respectively, is inserted in the shaft sections 19 and 21. It should be understood, however, that these joints and the separate sections 19 and 21 are necessary only when the frame structure is sufficiently flexible to become distorted under operating conditions, or when the housings 14 and 15 are loosely mounted. It will be sufficient, in most constructions, to combine sections 19 and 21 into a single shaft, and to substitute flexible couplings for the universal joints, since there generally is little or no tendency for sprung housings to separate or oscillate. The mechanism thus far described may be of the type disclosed more in detail in my Patent #1,703,536 granted February 26, 1929.

A pair of differentially driven shaft assemblies 24 projects laterally from each differential housing, the outer end of each assembly terminating in a driving spindle 27 that is journalled for rotation within a hub 28 and adapted to drive a wheel 29. Each shaft assembly 24 includes a pair of universal joints 25 and 26 for giving it sufficient flexibility to permit relative movement between the frame and the wheels.

The hubs 28, above referred to, provide spaces 31 for receiving bearings (not shown) and are rigidly carried by the free ends of a set of swinging rigid arms 32. These rigid arms support the frame 16 in the following manner:

At each side of the frame a pair of brackets 33, one forward of and one to the rear of the sub-frame 12, 13, is secured to the main frame as by riveting. The opposing pairs of brackets are provided with integrally suspended supporting extensions 34 through which project the ends of transverse trunnion shafts 35. The rigid arms 32 terminate at their pivotal ends in integral cup-shaped cylinders 36 which have central hubs 37 journalled upon the outer ends of trunnions 35. A friction disc 38, of washer shape and preferably formed of fabricated material, is inserted between each cylinder 36 and its corresponding supporting element 34. A set of angularly spaced integral partitions or fins 39 extend from the cylindrical surface of each cylinder 36, radially inward toward the hub 37 thereof. A closure and interlocking plate 41 fits over the open end of each cylinder, and has a hub 42 slidably and rotatably mounted on the hub 37 of said cylinder, and an integral set of angularly spaced interlocking fins 43 which project radially outward from hub 42 into proximity to the walls of cylinder 36. The fins 39 and 43 thus alternate within the annular space within cylinder 36 and are spaced and resiliently interlocked by a plurality of rubber blocks 44. To support the load, i. e., to prevent the frame from resting upon the flexible driving assemblies 24, the pair of interlocking plates 41 at each side of the frame are inter-tied in the following manner:

The outer face of each cover plate carries a radial upwardly projecting crank arm 45 terminating in an eye 46. A longitudinally arranged equalizing rod 47 has forked ends 48 which receive the pair of eyes 46 and are pivoted thereto by bolt and nut assemblies 49.

Coil springs 51 are fitted on the ends of the trunnion shafts and are maintained in compression against the plates 41 by nuts 52, thus in turn maintaining the discs 38 in close frictional engagement with the surfaces of bracket extensions 34 and cylinders 36.

From the foregoing description it will be understood that the load reacts to cause the trunnions to tend to move downwardly, thereby placing the equalizing rods 47 in tension. Likewise, when the road surface is so irregular as to cause one wheel to move upwardly such movement oscillates the corresponding arm 32 and, through the interlocked fins 39, 43 and rubber blocks 44, pulls upon equalizing rod 47 to cause the other wheel at the same side of the vehicle to move downwardly. Actually, however, said other wheel does not swing downwardly, since the road surface prevents it; but the first-mentioned wheels are permitted to move in spite of this because of the deformability and resilience of the rubber blocks and the compressibility of the pneumatic tires.

The rubber preferably is somewhat porous or spongy, or loosely fitted within the cylinders, in order that it may be compressed or deformed sufficiently to absorb road shocks and to permit oscillation of the arms 32. Since the rubber is disposed at the trunnion axes and pinched or squeezed into compression by radial oscillatable fins, it will be observed that the wheels and axles may rise and fall through relatively large distances, just as they do when spring means are employed in suspensions. This is because any slight arcuate movement of a point on the plate 41, permitted by angular deformation of the rubber blocks, is greatly multiplied at the corresponding hub 28 due to the length of the rigid arm 32.

The rubber and the rod 47 serve to equalize the load, and to distribute road shocks, upon the axles, as well as to cushion and support the load. They do not, however, dampen free oscillation of the axles. For instance, if the frame were lifted until the wheels cleared the road surface, the wheels could swing up and down freely, subject to no other restriction than that imposed by slight friction at the various pivotal points. It is to prevent this freedom of oscillation that the friction discs 38 have been inserted between the cylinders 36 and the bracket extensions 34. These discs frictionally and yieldably resist rebound, and prevent the axle oscillation from getting into phase with any substantially uniform and periodic irregularities in the road surface. They further resist any tendency for the rod 47 to be placed in compression and thereby possibly crystallized.

Figure 5 illustrates a more simple and compact arrangement than that of Figure 2, the equalizing rods 47 and one pair of the frame bracket 33 having been eliminated. Both devices, however, function in substantially the same manner.

With particular reference to Figures 5 and 6, each side of the frame 11 is supported on a bracket 53 which bracket is in turn supported on an end of a transverse trunnion shaft 54. A pair of telescoping spiders 55 and 56 corresponding to cylinders 36 and plates 41 respectively of Figure 2, are journalled upon the trunnion shaft and maintained in position thereon by a nut and washer assembly 57. Spider 56 is journaled upon the hub of spider 55 and both are resiliently interlocked by alternating webs and rubber blocks (as in Figures 3 and 4). The spider 55 integrally carries a set of radial webs 58 and the spider 56 integrally carries a set of radial webs 59.

The spider 55 forms the integral pivoted end of a rigid arm 61, and in like manner spider 56 forms the end of a rigid arm 62. The free ends of arms 61 and 62 carry semi-cylindrical sections 63 which cooperate with detachable caps 64 to house split rubber rings 65 of doughnut shape and to hold these rubber rings in yielding engagement with the ends of a pair of axle housings 66. As illustrated, these housings contain live shafts 67 driven from mechanism within unsprung worm and differential housings 68, but any other type of drive may be used and one or more of the axles may be dead axles if desired. A through drive arrangement is shown, including a primary shaft 69, a secondary shaft 71, and a plurality of universal joints 72 for rendering the drive sufficiently flexible to permit freedom of axle movement. The rubber rings permit the axles to tilt transversely with respect to the rigid arms 61 and 62, and may be designed to take torque reactions in the manner disclosed in Patent #1,692,891.

The modified form just described is substantially the same, in principle and mode of operation, as that of Figures 1–4 inc. Through the resiliently interlocked spiders the load is equalized upon the axles and shocks are transmitted from one axle to another. This is, in effect, a two-point equalizing suspension, since the elements thereof are pivoted for somewhat independent oscillation upon the frame on transverse axes, even though said axes are common and in coincidence. The oscillation dampener 38 of Figure 3 may be used in this construction but, in order to avoid repetition and to simplify the drawings, it is not shown.

Figure 7 discloses a modification of the apparatus of Figure 6, with a pneumatic device substituted for the resiliently interlocked spiders. In this form a pair of independent rigid arms 73 and 74 have their overlapped ends directly pivoted upon the trunnion shaft 54 about which the arms are free to oscillate upwardly to the extent permitted by the following mechanism:

Intermediate its ends each arm carries an integral upright lug 75. An open-ended cylinder 76 is connected to bracket 53, just over the trunnion, with its axis normally substantially in alignment with the upper ends of lugs 75. A pair of pistons 76 is reciprocatively disposed within the cylinder. One piston is connected to one of the lugs 75 by a wrist-pin 77, connecting rod 78, and pivot pin 79, and the other piston is connected to the other lug in like manner. The space between the pistons preferably is filled with compressed gas. Compressed air, for example, may be obtained from an air service line and injected into this space through a conventional Schrader valve 81 that is attached to the cylinder wall, as shown. However, it should be understood that a deformable and resilient body, as of rubber, may be placed between the pistons either with, or in lieu of, the compressed gaseous medium.

The apparatus of Figure 7 functions in similar manner to that of Figure 5, except that the rigid arms are not so interlocked that each resists both upward and downward independent oscillation of the other, the pistons and cylinder serving to resiliently resist only the upward movement of each axle. For this reason it is desirable to add a friction disc (not seen) like that of Figure 3.

In Figure 8 there is shown a further modification which may be said to be a cross between those of Figures 1–4 and Figures 5–7. Its axles, like those of Figures 1–4, swing about spaced transverse axes, and, like those of Figure 5–7, swing in arcs that would intersect if extended sufficiently. It comprises, at each side of the frame, a pair of spaced brackets 33 which receive a pair of trunnion shafts 82, a rigid bell crank 83 pivoted on each trunnion and comprising a rigid axle-supported arm 84 and a lighter upright arm 85, and mechanism for interconnecting the upright arms. The axles are illustrated as dead axles 86 oscillatable with the free ends of arms 84, but either one or both may be driven if desired. The interconnecting mechanism just referred to comprises a sleeve 87 pivoted as at 88 at the upper end of each arm 85 on a transverse horizontal axis, a longitudinal rod 89 slidably passing through the sleeves, and a pair of springs 91 and abutments 92 upon said rod to resist movement of the sleeves toward the center of said rod. The abutments 92 consist of nut and washer assemblies which may be adjusted along the rod to selectively vary the compression of each spring. Similar nut and washer assemblies 93 are attached to the projecting ends of rod 89 to prevent the sleeves 87 from sliding off the rod during abnormal downward axle oscillation.

The apparatus just described functions in like manner to that disclosed in Figure 7, the rod and sleeves taking the place of the cylinder and piston arrangement, and the springs yieldably resisting upward axle oscillation as did the compressed air in Figure 7.

The device of Figure 9 differs from that of Figure 8 only in that the axle-supported arm of the rigid bell crank is redesigned to cooperate with a detachable cap 64 to provide a housing for a split rubber ring 65. This ring is formed like, and has the same functions, as rings 65 of Figures 5 and 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a road vehicle construction a frame; a wheel-supported axle below said frame; an arm supported by said axle; a pivot for connecting said arm to said frame; a quantity of resilient and deformable material radially spaced from the axis of said pivot in proximity thereto; means carried by said arm and partaking of the angular movement thereof as the axle rises, said means being disposed to react against said deformable material during the rising movement of said axle; and other means for yieldingly resisting bodily movement of said material, said other means comprising a device pivotally mounted relative to the frame and mechanism for yieldingly resisting the pivotal movement of said device, whereby said material is cushioningly deformed when said arm-carried means reacts thereagainst.

2. In the construction defined in claim 1, said deformable material comprising a plurality of angularly spaced blocks; and each of said means comprising an element having a set of radial web-like fins projecting into alternate spaces between said deformable blocks and there being a disc frictionally engaged between said frame and one of said means.

3. In a multi-wheel vehicle, in combination with the end of one side of the chassis frame, a pair of closely spaced tandem axles; wheels supporting said axles; an arm individual to each axle and pivotally connected to the frame to swing about a horizontal transverse axis; a device rigidly carried by each arm and designed to move angularly with respect to the transverse pivotal axis thereof as said arm swings with its corresponding axle about said transverse axis; and means, including a quantity of non-metallic cushioning substance, radially arranged relative to the axis of oscillation of at least one of said arms for resiliently interconnecting said devices to yieldingly resist upward swinging of each axle with respect to the other, and to cushion and transmit portions of the road shocks from one axle to the other during operation of the vehicle.

4. In the combination defined in claim 3, said interconnecting means including a body of resilient and deformable rubber yieldably interlocking said arm-carried devices.

5. In a multi-wheel vehicle, in combination with one side of the chassis frame, an equalizing suspension comprising: a pair of axles; wheels supporting the ends of said axles; an arm supported by one of said axles and pivotally connected to the frame to permit said axle to swing in an arc about a horizontal transverse axis; a second arm supported by the other of said axles and pivotally connected to the frame to permit said other axle to swing in an arc about a horizontal transverse axis; a pair of devices, one carried by each arm and designed to move angularly with respect to the transverse pivotal axis thereof as said arm swings with its corresponding axle about said transverse axis; and means, comprising deformable rubber material, resiliently interconnecting said devices to yieldingly resist upward swinging of each axle with respect to the other, and to cushion and transmit portions of the road shocks from one axle to the other during operation of the vehicle; said transverse axes being coincident, whereby said axles swing in non-parallel and intersecting arcs; and said deformable material being in the form of radially arranged blocks interposed between said arm-carried devices to yieldably interlock said arms.

6. In a multiwheel vehicle, in combination with one side of the chassis frame, a pair of axles; wheels supporting said axles; an arm individual to each axle and pivotally connected to the frame to swing about an axis that is transverse to the chassis frame; means carried by each arm and designed to oscillate bodily about the transverse pivotal axis thereof as said arm swings with its corresponding axle about said transverse axis; and means resiliently interconnecting said arm-carried means to yieldingly resist upward swinging of each axle with respect to the other, and to cushion and transmit portions of the road shocks from one axle to the other during operation of the vehicle; said transverse axes being spaced apart longitudinally of the vehicle; and said interconnecting means comprising bodies of resilient and deformable material disposed adjacent said arm-carried means, devices pivoted on said transverse axes and engaging said material on the opposite sides therefrom than said arm-carried means, and mechanism intertying said devices at points offset from the pivotal axes thereof.

ARTHUR I. MARCUM.